United States Patent
Jau et al.

(10) Patent No.: US 9,425,904 B2
(45) Date of Patent: Aug. 23, 2016

(54) RACK SERVER

(71) Applicant: Quanta Computer Inc., Taoyuan Shien (TW)

(72) Inventors: Maw-Zan Jau, Taipei (TW); Wei-Yi Chu, Taipei (TW); Ting-Chen Ko, Taoyuan Shien (TW); Chia-Ming Liang, Taoyuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 0 days.

(21) Appl. No.: 14/261,937

(22) Filed: Apr. 25, 2014

(65) Prior Publication Data
US 2015/0071646 A1    Mar. 12, 2015

(30) Foreign Application Priority Data
Sep. 11, 2013 (TW) .............................. 102132834 A

(51) Int. Cl.
*H04B 10/00* (2013.01)
*H04B 10/80* (2013.01)

(52) U.S. Cl.
CPC .................................. *H04B 10/803* (2013.01)

(58) Field of Classification Search
CPC ...... H04B 10/11; H04B 10/40; H04B 10/803; H04B 10/801; H04B 10/116; H04B 10/118; H04B 10/25754; G08C 23/04; G08C 17/02; G08C 19/16; G08C 2201/93; H04W 84/12; H04W 88/02; H04W 88/08; H04W 88/085
USPC .......... 398/128, 129, 135–138, 130, 118, 164
See application file for complete search history.

(56) References Cited

U.S. PATENT DOCUMENTS

| | | | | |
|---|---|---|---|---|
| 5,726,786 A * | 3/1998 | Heflinger | ........... | H04B 10/1149 398/121 |
| 5,999,295 A * | 12/1999 | Vowell | ................. | H04B 10/801 385/92 |
| 6,934,477 B2 * | 8/2005 | Willebrand | ........ | H04B 10/1125 359/341.1 |
| 7,082,528 B2 * | 7/2006 | Zaudtke | .............. | G06F 11/0709 235/462.15 |
| 7,203,424 B2 * | 4/2007 | Alwan | ................... | H04B 10/11 398/120 |
| 7,564,894 B2 * | 7/2009 | Woolf | .................... | H04B 10/40 375/219 |
| 7,610,011 B2 * | 10/2009 | Albrett | ................... | G06Q 30/02 455/186.1 |
| 7,899,333 B2 * | 3/2011 | Ma | ......................... | H01L 23/34 398/135 |
| 8,111,999 B2 * | 2/2012 | Ekkizogloy | ............ | H04B 10/40 398/135 |
| 8,287,434 B2 * | 10/2012 | Zavadsky | ............... | A63B 21/00 482/1 |

(Continued)

FOREIGN PATENT DOCUMENTS

TW   M429128 U1   5/2012
TW   201328575 A1   7/2013

OTHER PUBLICATIONS

First Office Action mailed on Jul. 17, 2015 in Taiwanese Application No. 10420936170.

(Continued)

*Primary Examiner* — Hibret Woldekidan
(74) *Attorney, Agent, or Firm* — Polsinelli PC

(57) ABSTRACT

Provided herein is a rack server including a rack, a plurality of system boards and a fan plate. The system boards are disposed within the rack, and each system board has a first wireless transceiver. The fan plate is also disposed within the rack, and the fan plate has a plurality of second transceivers, and the second transceivers are wirelessly connected to the first transceivers, respectively.

10 Claims, 4 Drawing Sheets

(56) References Cited

U.S. PATENT DOCUMENTS

| | | | | |
|---|---|---|---|---|
| 8,290,425 B2 * | 10/2012 | Albrett | ............... | G06Q 30/02 455/186.1 |
| 8,315,526 B2 * | 11/2012 | Tan | ............... | H04B 10/803 398/118 |
| 8,766,782 B2 * | 7/2014 | Madonna | ............... | G01S 5/02 340/12.22 |
| 8,817,464 B2 * | 8/2014 | Jau | ............... | H05K 7/1492 361/679.48 |
| 8,974,125 B2 * | 3/2015 | McColloch | ............... | H04B 10/40 361/676 |
| 2004/0202476 A1 * | 10/2004 | Woolf | ............... | H04B 10/40 398/135 |
| 2007/0003289 A1 * | 1/2007 | Tan | ............... | H04B 10/1127 398/164 |
| 2010/0296820 A1 * | 11/2010 | Kuo | ............... | H04B 10/803 398/201 |
| 2011/0140644 A1 * | 6/2011 | Jeung | ............... | H05K 9/0058 318/400.24 |
| 2012/0327591 A1 * | 12/2012 | Jau | ............... | H05K 7/1492 361/679.48 |
| 2013/0010018 A1 * | 1/2013 | Economy | ............... | H05B 37/0272 345/691 |
| 2013/0058040 A1 * | 3/2013 | Yokoyama | ............... | H05K 7/186 361/697 |
| 2013/0128438 A1 | 5/2013 | Huang et al. | | |
| 2013/0170134 A1 | 7/2013 | Shih et al. | | |
| 2014/0241718 A1 * | 8/2014 | Jiang | ............... | H04B 10/40 398/48 |
| 2014/0293523 A1 * | 10/2014 | Jau | ............... | H05K 7/14 361/679.4 |
| 2015/0088288 A1 * | 3/2015 | Madonna | ............... | G01S 5/02 700/90 |
| 2015/0204561 A1 * | 7/2015 | Sadwick | ............... | F24F 11/006 236/1 C |

OTHER PUBLICATIONS

English Summary of First Office Action mailed on Jul. 17, 2015 in Taiwanese Application No. 10420936170.

* cited by examiner

RACK SERVER

RELATED APPLICATIONS

This application claims priority to Taiwan Application Serial Number 102132834, filed Sep. 11, 2013, which is herein incorporated by reference.

BACKGROUND

1. Field of Invention

The present invention relates to a server. More particularly, the present invention relates to a rack server.

2. Description of Related Art

Inside conventional large rack servers, the communication and transmission of signals between boards are usually connected by cables; however, when the number of internal systems within a rack increases, so does the number of cables and boards; thereby resulting a decrease of the internal available pace; accordingly, such infrastructure of conventional racks limits the flexibility for future design, lowers the heat efficiency, increases the complexity in assembling and disassembling, and raises the costs for manpower and materials.

On the other hand, the infrastructure of conventional racks employs the cable as the media for transmitting and controlling signals, and hence, the planning complexity of signals is also quite high.

In view of the foregoing, there exist problems and disadvantages in the related art for further improvement; however, those skilled in the art sought vainly for a suitable solution. In order to solve or circumvent above problems and disadvantages, there is an urgent need in the related field to provide means for reducing the number of boards and cables and lowering the design complexity of signals.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

In one aspect, the present disclosure provides a rack server to solve or circumvent aforesaid problems and disadvantages.

The rack server according to the present disclosure comprises a rack, a plurality of system boards and a fan board. The plurality of system boards are disposed within the rack, wherein each system board has a first wireless transceiver; the fan board is also disposed within the rack, wherein the fan board has a plurality of second wireless transceivers, and the plurality of second wireless transceivers are wirelessly connected to the plurality of first wireless transceivers respectively.

In one embodiment, rack server further comprising a plurality of fans. These fans are disposed within the rack, and are all electrically connected to the fan board.

In one embodiment, each system board has a control circuit; the control circuit is configured to control the first wireless transceiver to send a first wireless signal to a corresponding second wireless transceiver, so that the fan board is operable to control the rotating speed of at least one of the plurality of fans.

In one embodiment, the first wireless transceiver is a first infrared transceiver, the second wireless transceiver is a second infrared transceiver, and the first wireless signal is a first infrared signal.

In another embodiment, the control circuit controls to first infrared transceiver to send the first infrared signal to a corresponding second infrared transceiver, based on an infrared data association (IrDA) protocol.

In another embodiment, each system board has an interposer and a baseboard management controller (BMC), the control circuit and the first infrared transceiver are both disposed within the interposer, and the control circuit receives an $I^2C$ signal from the baseboard management controller and controls the first infrared transceiver to send the first infrared signal according to the $I^2C$ signal and based on the infrared data association protocol.

In another embodiment, the fan board has a fan controller; the fan controller is configured to generate a pulse-width modulation signal according to the first infrared signal so as to control the rotating speed of at least one of the plurality of fans, and read the status information of the plurality of fans.

In another embodiment, the fan controller controls the plurality of second infrared transceivers to respectively send a plurality of second infrared signals to the plurality of corresponding first infrared transceivers, based on the infrared data association protocol, wherein each second infrared signal comprises the status information of the plurality of fans.

In still another embodiment, the control circuit uses a pulse-width modulation (PWM) to control the first infrared transceiver to send the first infrared signal to the corresponding second infrared transceiver.

In yet another embodiment, each system board has an interposer and a baseboard management controller, the control circuit and the first infrared transceiver are both disposed within the interposer, the control circuit receives an $I^2C$ signal from the baseboard management controller uses the pulse-width modulation to control the first infrared transceiver to send the first infrared signal according to the $I^2C$ signal.

In yet another embodiment, the fan board has a fan controller which is configured to generate a pulse-width modulation signal to control the rotating speed of at least one of the plurality of fans, according to the first infrared signal, and read the status information of the plurality of fans.

In another embodiment, the fan controller uses a pulse-width modulation to control the plurality of second infrared transceivers to respectively send a plurality of second infrared signals to the plurality of corresponding first infrared transceivers, wherein each second infrared signal comprises the status information of the plurality of fans.

In yet another embodiment, the system boards are disposed in parallel to one another, and the fan board is perpendicular to the plurality of system boards.

In view of the foregoing, the technical solutions of the present disclosure result in significant advantageous and beneficial effects, compared with existing techniques. The implementation of the above-mentioned technical solutions achieves substantial technical improvements and provides utility that is widely applicable in the industry. Specifically, technical advantages generally attained, by embodiments of the present invention, include: the present disclosure, by using signal integration and adopting wireless transmission of the signals, simplifies the infrastructure of conventional racks, reduces the amount of rack cables and boards, and further improve the heat efficiency and reduces the design complexity and material cost.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
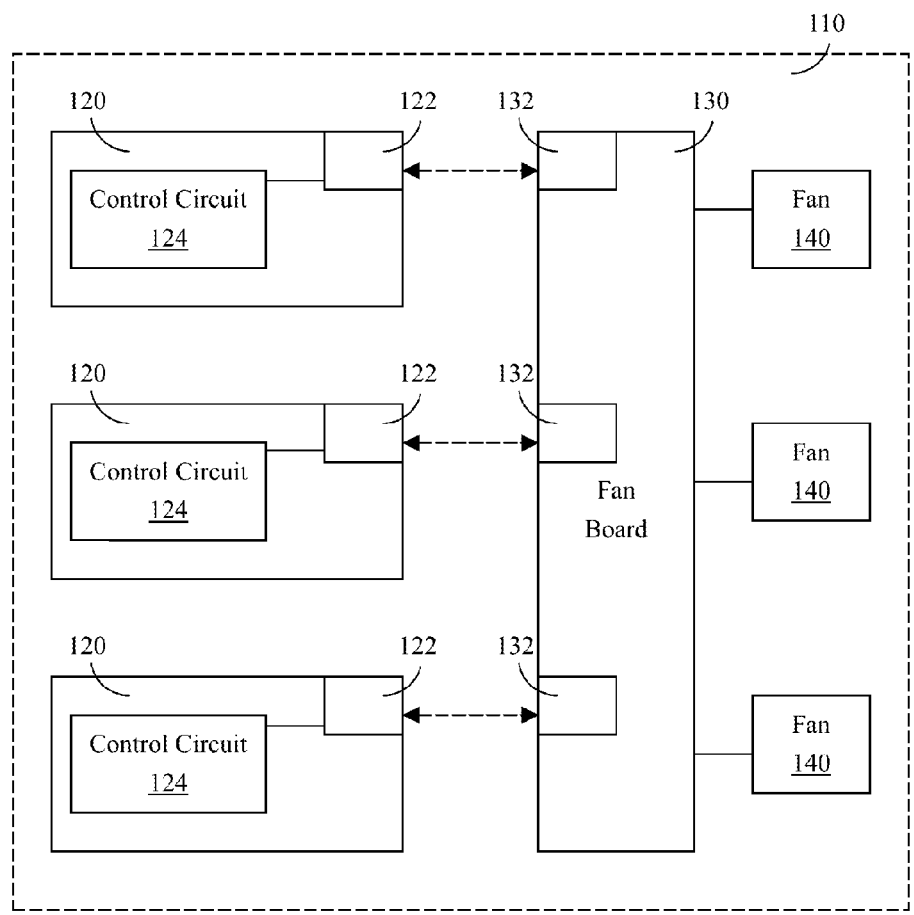
FIG. 1 is a schematic diagram illustrating the structure of a rack server according to one embodiment of the present disclosure.

In the following detailed description, for purposes of explanation, numerous specific details are set forth in order to attain a thorough understanding of the disclosed embodiments. In accordance with common practice, the various described features/elements are not drawn to scale but instead are drawn to best illustrate specific features/elements relevant to the present invention. Also, like reference numerals and designations in the various drawings are used to indicate like elements/parts. Moreover, well-known structures and devices are schematically shown in order to simplify the drawing and to avoid unnecessary limitation to the claimed invention.

FIG. 1 is a schematic diagram illustrating the structure of a rack server 100 according to one embodiment of the present disclosure. As illustrated in FIG. 1, the rack server 100 comprises a rack 110, a plurality of system boards 120, a fan board 130 and a plurality of fans 140. In structure, the system boards 120, the fan board 130 and fans 140 are all disposed within the rack 110, wherein each of the system boards 120 has a first wireless transceiver 122, the fan board 130 has a plurality of second wireless transceivers 132, and the plurality of fans 140 are all electrically connected to the fan board 130. In operation, the plurality of second wireless transceivers 132 and the plurality of first wireless transceivers 122 respectively establish wireless communication, and each first wireless transceiver 122 sends a wireless signal to a corresponding second wireless transceiver 132, so as to allow the fan board 130 to control the fans 140. It should be noted that, in FIG. 1, the fans 140 are illustrated at the right side for the purpose to facilitate the drawing presentation; however, it is not intended to limited the present disclosure; in practice, the fans 140 can be disposed at a side that is near the system boards 120; persons having ordinary skill in the art may flexibly choose the disposition means and specific orientation of the fans 140 depending on actual needs.

In this way, the present disclosure employs wireless transmission to simplify the overall structure of the rack; in comparison, conventional racks use cable transmission thereby resulting in a more complex rack design with increased number of systems, and hence, the number of boards and cables are also greatly increased. The rack 110 according to the present disclosure uses a wireless transmission therein, which integrates the signals and then wirelessly transfers the signals; in this way, the design scheme of the rack is simplified, thereby decreasing the number of boards and cables required, and hence, even the number of system boards 120 increases, it won't increase the complexity of the design.

In implementation, the system boards 120 may comprises a central processing unit (CPU), a storage device (such as, a hard drive), a specific PCI slot and other circuits; the system boards 120 can be a modulized closed system and support plugging, maintaining, replacing (tool-free); if any system board 120 thereof is in need of fixing, the maintainer can manually unplug it and remove the cable(s), which is very convenient. Moreover, the fan board 130 can be a printed circuit board component, in which a single fan board 130 can control a plurality of fans 140, which also decrease the amount of boards and cables used.

In FIG. 1, each of the system boards 120 has a control circuit 124; in structure, the control circuit 124 is electrically connected to the first wireless transceiver 122. In operation, the control circuit 124 is configured to control the first wireless transceiver 122 to send a first wireless signal to a corresponding second wireless transceiver 132, such that the fan board 130 is operable to control the rotating speed of at least one of the plurality of fans 140.

In implementation, the first wireless transceiver 122 and the second wireless transceiver 132 can use any wireless transmission mode therebetween, such as: radio communication, bluetooth, infrared, Wi-Fi, near field communication, or other communication modes that are conventionally-used or under development. For example, the first wireless transceiver 122 can be a first bluetooth transceiver, a first infrared transceiver, a first Wi-Fi modules, etc., and the second wireless transceiver 132 can be a second bluetooth transceiver, a second infrared transceiver, a second Wi-Fi modules, etc.

Figure 2:
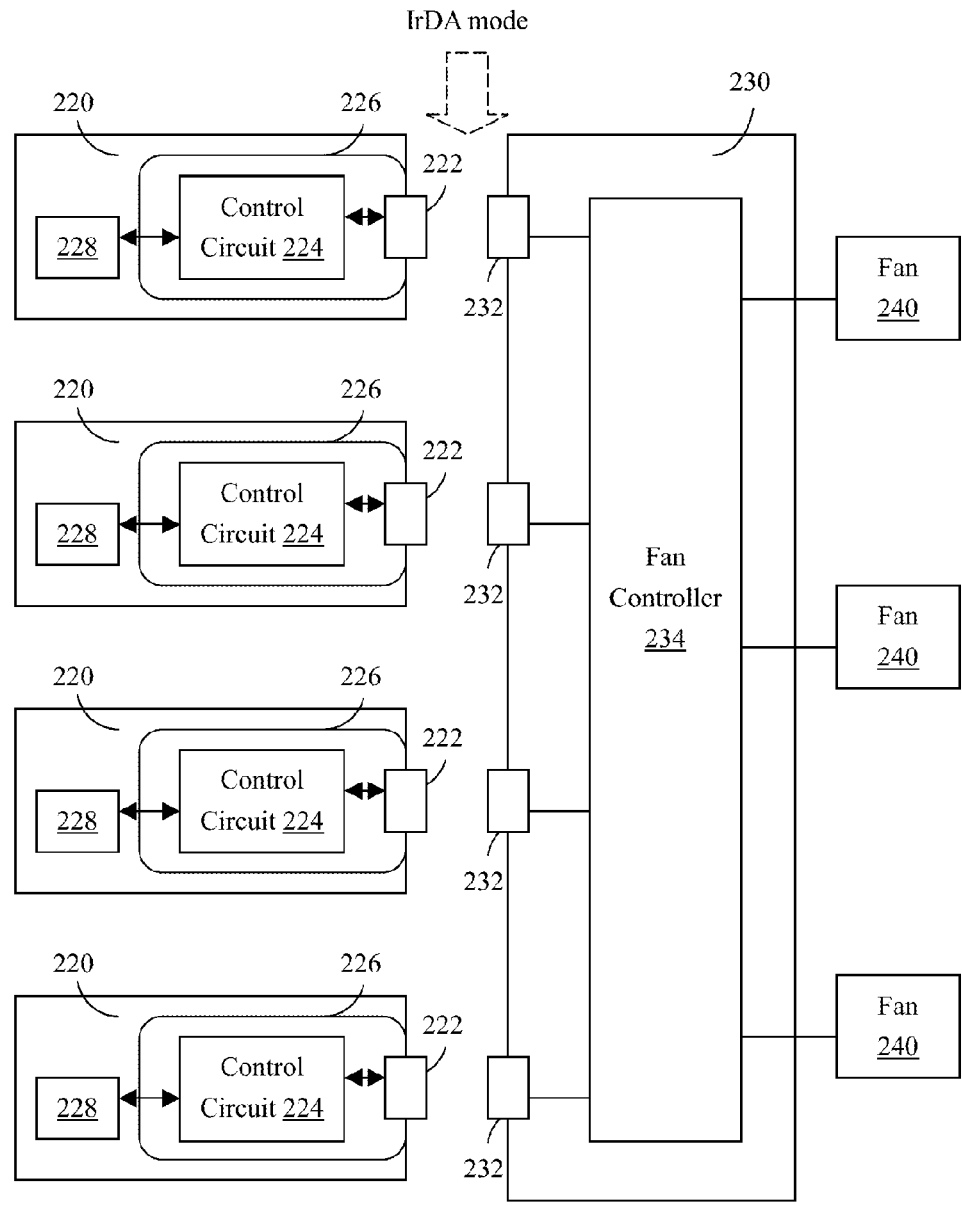
FIG. 2 is a block diagram illustrating the circuit of a rack server in an infrared data association mode according to another embodiment of the present disclosure.

FIG. 2 is a block diagram illustrating the circuit of a rack server 200 in an infrared data association mode (IrDA mode) according to another embodiment of the present disclosure. As illustrated in FIG. 2, the first infrared transceiver 222 serves as a first wireless transceiver, the second infrared transceiver 232 served as a second wireless transceiver, and the control circuit 224 controls the first infrared transceiver 222 to send a first infrared signal to a corresponding second infrared transceiver 222, based on the infrared data association (IrDA) protocol, so as to allow the fan board 230 to control fans 240. In the present embodiments, the infrared data association mode is in compliance with existing common specification, which is simple to use and low in implementation cost.

In FIG. 2, each of the system boards 220 has an interposer 226 and a baseboard management controller (BMC) 228. In structure, the control circuit 224 and the first infrared transceiver 222 are both disposed within the interposer 226, and the baseboard management controller 228 is electrically connected to the control circuit 222 via the I$^2$C main line. In use, the control circuit 222 receives an I$^2$C signal from the baseboard management controller 228 and controls the first infrared transceiver to send the first infrared signal according to the I$^2$C signal and based on the infrared data association protocol.

In implementation, the interposer 226 can be a power supply module which is configured to receive external electricity and transfer the electricity to each electric component in the system boards 220. The control circuit 224 can be a control chip, microcontroller or other controller component; the baseboard management controller 228 can be electrically connected to a south bridge circuit or integrated within the south bridge circuit; persons having ordinary skill in the art may flexibly chose an appropriate configuration depending on actual needs.

In FIG. 2, the fan board 230 has a fan controller 234. In structure, the plurality of second infrared transceivers 232 are all electrically connected to a same fan controller 234, and a single fan controller 234 may be electrically connected to a plurality of fans 240. In use, the fan controller 234 generates a pulse-width modulation signal to control the rotating speed of at least one of the plurality of fans 240, according to the first infrared signal, and reads the status information (e.g., the presence or absence of the fan, rotating speed of the fan, temperature and so on) of the plurality of fans 240; moreover, the fan controller 234 can also be implemented as a lighting signal emitted from the light-emitting element on the control fans 240, wherein the light-emitting element can be such as a light-emitting diode (LED). In implementation, the fan controller 234 can be a control chip, microcontroller or other controller components that uses a pulse-width modulation technique to control the rotating speed of fans 240.

Thereafter, the fan controller 234 controls the plurality of second infrared transceivers 232 to send a plurality of second infrared signals to the plurality of respective corresponding first infrared transceivers 222, based on the infrared data association protocol, wherein each second infrared signal comprises the status information (e.g., the presence or absence of the fan, rotating speed of the fan, temperature and so on) of the plurality of fans 240, so that the system boards 220 can obtain the current status of the fans 240 in real time, so as to allow the performance of subsequent process/processes. In this way, each independent system board 220 within the rack may achieve the purpose of self-monitoring of the temperature and controlling the fans 240.

Figure 3:
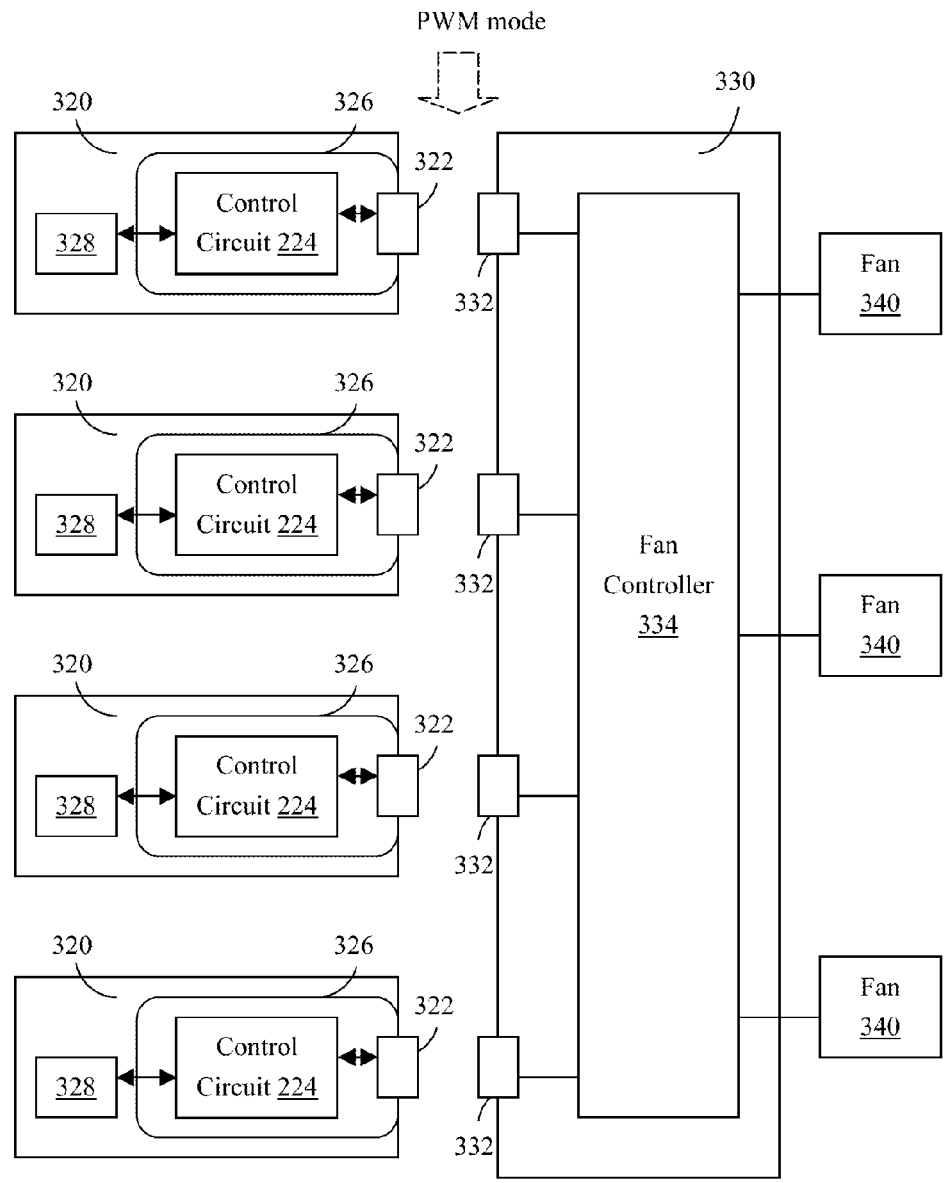
FIG. 3 is a block diagram illustrating the circuit of a rack server in a pulse-width modulation mode according to yet another embodiment of the present disclosure.

FIG. 3 is a block diagram illustrating the circuit of a rack server 300 in a pulse-width modulation mode (PWM mode) according to yet another embodiment of the present disclosure. As illustrated in FIG. 3, the first wireless transceivers are first infrared transceivers 322, the second wireless transceivers are second infrared transceivers 332, and the control circuits 324 use the pulse-width modulation (PWM) technique to control the first infrared transceivers 322 to send first infrared signals as the first wireless signals to the corresponding second infrared transceivers 322, so that the fan board 330 can control the fans 340. In the present embodiment, the pulse-width modulation mode modulates the duty cycle of the square waves, thereby achieving a more flexible encoding; the greatest advantages of this technique are that the infrared signals are in digital forms that require no digital-to-analog conversion and the anti-interference capability against the noises is also substantially enhanced.

In FIG. 3, each of the system boards 320 has an interposer 326 and a baseboard management controller 328. In structure, the control circuits 324 and the first infrared transceivers 322 are all disposed within the interposer 326, the baseboard management controller 328 is electrically connected to the control circuit 322 via an I²C main line. In use, the control circuit 322 receives an I²C signal from the baseboard management controller 328 and controls the first infrared transceiver to send a first infrared signal according to the I²C signal by using pulse-width modulation.

In implementation, the interposer 326 can be a power supply module which is configured to receive external electricity and transfer the electricity to each electric component in the system boards 320. The control circuit 324 can be a control chip, microcontroller or other controller component; the baseboard management controller 328 can be electrically connected to a south bridge circuit or integrated within the south bridge circuit; persons having ordinary skill in the art may flexibly chose an appropriate configuration depending on actual needs.

In FIG. 3, the fan board 330 has a fan controller 3234. In structure, the plurality of second infrared transceivers 332 are all electrically connected to a same fan controller 334, and a single fan controller 334 may be electrically connected to a plurality of fans 340. In use, the fan controller 334 generates a pulse-width modulation signal to control the rotating speed of at least one of the plurality of fans 340, according to the first infrared signal, and reads the status information (e.g., the presence or absence of the fan, rotating speed of the fan, temperature and so on) of the plurality of fans 340; moreover, the fan controller 334 can also be implemented as a lighting signal emitted from the light-emitting element on the control fans 340, wherein the light-emitting element can be such as a light-emitting diode (LED). In implementation, the fan controller 334 can be a combination of a complex programmable logic device (CPLD) and a speed counter, or other controller components that uses a pulse-width modulation technique to control the rotating speed of fans 340.

Thereafter, the fan controller 334, using the pulse-width modulation, controls the plurality of second infrared transceivers 332 to send a plurality of second infrared signals to the plurality of respective corresponding first infrared transceivers 322, wherein each second infrared signal comprises the status information (e.g., the presence or absence of the fan, rotating speed of the fan, temperature and so on) of the plurality of fans 340, so that the system boards 320 can obtain the current status of the fans 340 in real time, so as to allow the performance of subsequent process/processes.

Figure 4:
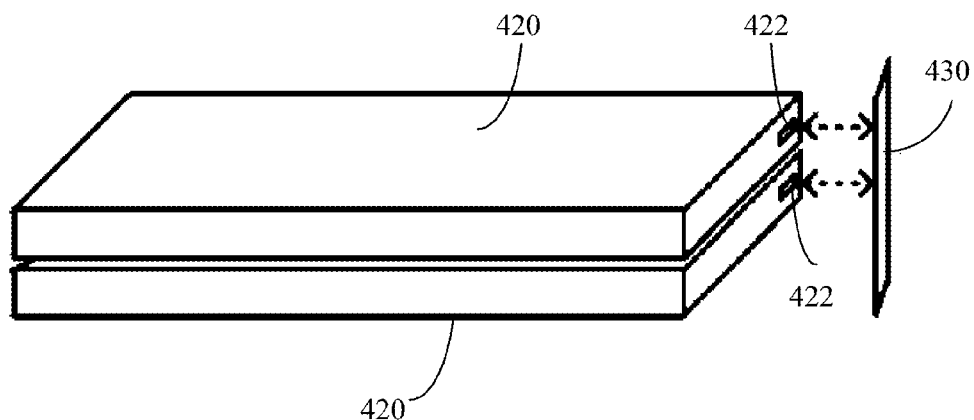
FIG. 4 is a schematic diagram illustrating the three-dimensional view of a rack server according to still another embodiment of the present disclosure.

FIG. 4 is a schematic diagram illustrating the three-dimensional view of a rack server 400 according to still another embodiment of the present disclosure. As illustrated in FIG. 4, a single fan board 430 is corresponding to a plurality of system boards 420. In structure, the system boards 420 are disposed in parallel to one another. Owing to the perpendicular incidence of the infrared, infrared communication techniques are not suitable in places with more obstacles for transmission; by using a fan board 430 that is perpendicular to the plurality of system boards 420, the first infrared signal transmitted from each first infrared transceiver 422 can aim at the fan board 430. On the other hand, a vertical fan board 430 tends to interfere less with the wind current (or air flow), thereby improving the heat dissipation effect.

In view of the foregoing, the present disclosure has several advantages. In terms with the mechanical aspect, the boards and cables required inside the rack is reduced, thereby reducing the design complexity of the interior of the rack and solving the fault tolerance issues associated with the assembly of conventional connectors. Regarding the heat flow, the test data revealed that removing the boards and cables increased the airflow by 5 CFM (cubic foot per minute) and affect the fan duty by 2%. With respect to the cost, reducing the use of boards and cables may reduce the material cost and lower the complexity in assembling/disassembling during production. As to the electronic aspect, using a single wireless transmission to integrate the signals can reduce the complexity in signal design.

Although various embodiments of the invention have been described above with a certain degree of particularity, or with reference to one or more individual embodiments, they are not limiting to the scope of the present disclosure. Those with ordinary skill in the art could make numerous alterations to the disclosed embodiments without departing from the spirit or scope of this invention. Accordingly, the protection scope of the present disclosure shall be defined by the accompany claims.

What is claimed is:

1. A rack server, comprising:
   a rack;
   a plurality of fans disposed within the rack;
   a plurality of system boards disposed within the rack, wherein each of the plurality of system boards comprises
   an interposer that includes a first wireless transceiver and a control circuit, and
   a baseboard management controller; and
   a fan board disposed within the rack, wherein the fan board comprises a plurality of second wireless transceivers, and the plurality of second wireless transceivers are operable to wirelessly connected to the first wireless transceiver in each of the plurality of system boards, respectively,
   wherein the control circuit is operable to receive an inter-integrated circuit (I$^2$C) signal from the baseboard management controller and control the first wireless transceiver to send a first wireless signal according to the I$^2$C signal.

2. The rack server of claim 1, wherein the first wireless transceiver is a first infrared transceiver, the plurality of second wireless transceivers are each a second infrared transceiver, and the first wireless signal is a first infrared signal.

3. The rack server of claim 2, wherein the control circuit uses a pulse-width modulation (PWM) to control the first wireless transceiver to send the first wireless signal to a one of the plurality of second wireless transceivers.

4. The rack server of claim 3, wherein the control circuit is operable to receive and use the pulse-width modulation to control the first wireless transceiver to send the first wireless signal according to the I$^2$C signal.

5. The rack server of claim 4, wherein the fan board comprises a fan controller configured to generate a pulse-width modulation signal according to the first wireless signal so as to control a rotating speed of at least one of the plurality of fans and read status information of the plurality of fans.

6. The rack server of claim 1, wherein the fan controller is operable to use a pulse-width modulation to control the plurality of second wireless transceivers to send a plurality of second wireless signals to the first wireless transceiver in each of the plurality of system boards, respectively, wherein each second wireless signal comprises the status information of the plurality of fans.

7. The rack server of claim 2, wherein the plurality of system boards are disposed in parallel to one another, and the fan board is perpendicular to the plurality of system boards.

8. The rack server of claim 2, wherein the control circuit is based on an infrared data association (IrDA) protocol to control the first infrared transceiver to send the first infrared signal to the second infrared transceiver.

9. The rack server of claim 1, wherein the fan board comprises a fan controller configured to generate a pulse-width modulation signal according to the first wireless signal_to control a rotating speed of at least one of the plurality of fans and read status information of the plurality of fans.

10. The rack server of claim 9, wherein the fan controller controls the plurality of second wireless transceivers to respectively send a plurality of second wireless signals to the first wireless transceiver in each of the plurality of system boards, respectively, based on a wireless data association protocol, wherein each of the plurality of second wireless signals comprises the status information of the plurality of fans.

* * * * *